Feb. 25, 1958 A. ELOVIC ET AL 2,824,776
MAGNETIC RECORDING
Filed Aug. 10, 1956
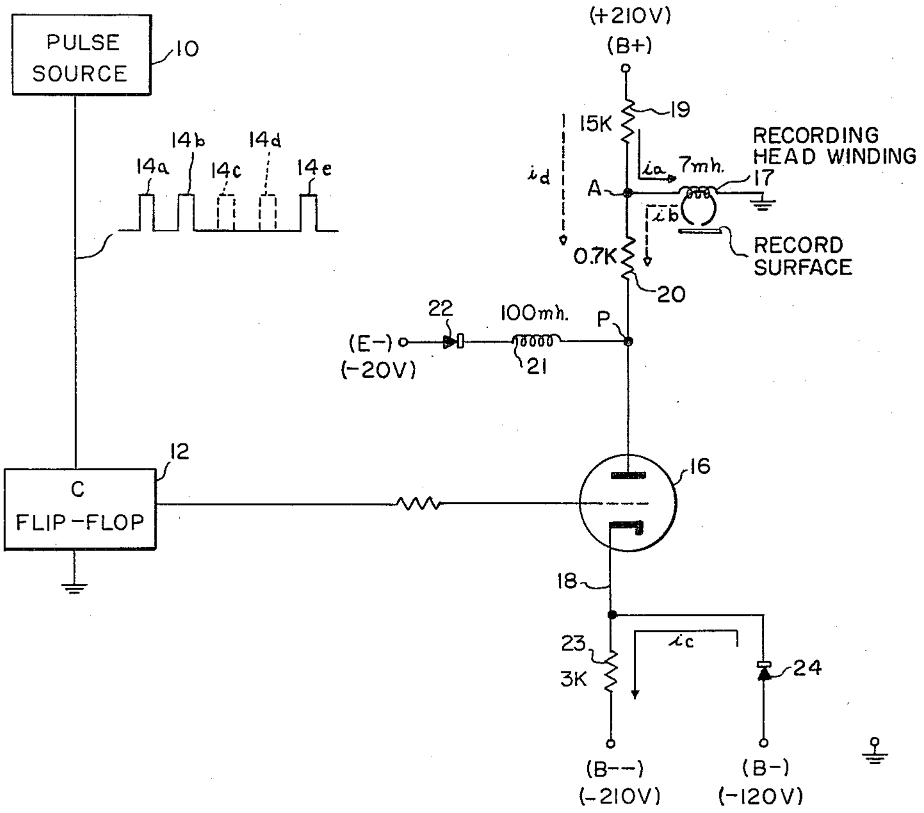
INVENTORS
ALEXANDER ELOVIC
DONALD T. BEST
BY
ATTORNEY 2,824,776
Patented Feb. 25, 1958

2,824,776

MAGNETIC RECORDING

Alexander Elovic and Donald T. Best, Philadelphia, Pa., assignors to Burroughs Corporation, Detroit, Mich., a Michigan corporation Application August 10, 1956, Serial No. 603,370

8 Claims. (Cl. 346—74)

This invention relates to magnetic recording. More specifically, the invention provides an improved circuit particularly useful in magnetic tape recording but also useful in magnetic recording on drums or other surfaces.

In one system, sometimes referred to as a non-return-to-zero form of magnetic recording, one of the two binary digits (for example, the binary "1") is indicated by a change in the polarity of an elemental area of the magnetic surface as compared with that of a preceding elemental area, the other binary digit (in this example, the binary "0") being indicated by the absence of change in the polarity of magnetization. In other words, as the magnetic surface moves past the reading head, a change in magnetization, either from negative to positive or from positive to negative, indicates one of the binary digits (for example, the binary "1") while no change in polarity indicates the other binary digit.

In the above type of magnetic recording, it is important that the write circuit be capable of switching the direction of current flow through the magnetic recording head as quickly as possible, for example, in one to three microseconds. In addition, it is important that the amount of current be regulated, so that the amount of current flowing in each of the two directions is sufficient to saturate the elemental area of the magnetic surface without, however, being excessive. Too much current is not only wasteful of power, it causes spreading of the magnetized area, thus preventing close and efficient packing of the information bits.

A principal object of the present invention is to provide an improved write circuit for use in a change-of-polarity type of non-return-to-zero magnetic recording system.

A more specific object is to provide a magnetic-head write circuit which, in response to an input signal representing one of the two binary digits, is capable of very rapid switching of the current through the magnetic recording head, irrespective of the direction in which the current had been previously flowing, and which, in addition is capable of regulating the amount of current flowing through the recording head in each direction.

In accordance with one embodiment of the present invention, the foregoing and other objects are achieved by a circuit arrangement which provides current stabilization by cathode degeneration in combination with diode D.-C. clamping of the plate of a triode which controls the switching of the current through the magnetic recording head. To diode clamp the plate of the control triode would, in the absence of the means provided by the present invention, slow down the switching time to an intolerable extent. According to the present invention, this is avoided by providing in the clamping lead a choke having low D.-C. resistance but high impedance to the switching current. Thus, the choke, in effect, removes the diode from the circuit during the switching period, but permits the diode to clamp the triode anode during the steady-state condition, thereby to regulate the current.

While the foregoing is a summary, the invention will be best understood from a consideration of the following detailed description and drawing of a preferred embodiment.

Referring now to the drawing, there is shown a pulse source 10 connected to the complement input terminal C of the flip flop 12. For convenience in describing the present invention, it will be assumed that pulses, such as those identified in the drawing as 14*a*, 14*b*, 14*e*, represent in each case the binary "1," while the absence of pulses, such as at the time periods indicated by the dotted pulses 14*c*, 14*d*, represent in each case the binary "0." The application of a pulse to the complement terminal C is effective to change the state of the flip flop 12 from its resident to its opposite state, irrespective of which state the flip flop is in at the time the pulse is applied. Thus, in the present example, the flip flop changes its state each time a binary "1" is applied.

The output of the flip flop 12 is connected to the grid of a triode 16. When flip flop 12 is in one of its two bi-stable states, the D.-C. output level of the flip flop is such that triode 16 is cut off, whereas when the flip flop is in its other state, the triode 16 conducts. Thus, the triode 16 changes its conductive state each time a binary "1" pulse is delivered from pulse source 10.

When, as a result of the state of flip flop 12, the triode 16 is in its non-conducting state, a current $i_a$ flows through the winding 17 of the magnetic recording head in the direction indicated in the drawing by the solid arrow. The magnitude of the current $i_a$ is determined by the magnitude of the positive potential source (B+), the value of the resistor 19, and the D.-C. resistance of the winding 17. The D.-C. resistance of winding 17 is negligible compared with that of resistor 19 and the common junction of winding 17 and resistor 19, identified as point A in the drawing, is substantialy at ground potential.

When triode 16 is not conducting, and ignoring the reverse and leakage current through diode 22, no current flows through resistor 20 or choke 21 since the diode 22 is biased back by the negative potential source E— connected to the diode anode. Hence, the anode of triode 16, identified as point P in the drawing, is at the same potential as point A, which as indicated above is substantially at ground potential.

When triode 16 is not conducting, current does flow through its cathode resistor 23 and through the diode 24 shunted thereacross since the potential source (B—) connected to the lower end of cathode resistor 23 is chosen to be more negative than potential since (B—) connected to the anode of diode 24. Cathode 18 is, therefore, at B— when triode 16 is not conducting.

When, in response to the application of a binary "1" pulse to its complement input, the flip flop 12 changes state, the triode 16 is likewise caused to change its state. In the present discussion, the triode 16 would change from its non-conducting to its conducting state. When triode 16 conducts, its anode (point P) which has been at ground potential during non-conduction, is driven down toward the potential of the cathode 18, which as indicated above is at the potential of source (B—). The function of potential source (E—), connected to the triode anode (point P) by way of diode 22 and choke 21, is to clamp point P to a fixed potential during the conducting period of the triode, thereby to provide a constant voltage across resistor 20, and thereby to regulate the amount of current through the winding 17, as will be more fully described. However, during the transition or switching period, the presence of the diode 22 would seriously impair the ability of the circuit to effect rapid switching, since the winding 17 would see a relatively low resistance to ground through resistor 20 and the low forward resistance of diode 22 in parallel with the plate resistance of triode 16, and the $L/R$ time constant of the circuit controlling the change in the magnetic field of winding 17 would be relatively and objectionably large.

In accordance with the present invention, the objectionably slow switching referred to above is avoided, and yet D.-C. current regulation is achieved, by placing a choke 21, whose inductance is chosen to be much greater than that of the winding 17, in series with the diode clamping circuit. The choke effectively disconnects the diode 22 from the circuit during the switching period.

Shown on the drawing are illustrative component values which will accomplish the fast switching and current regulation desired. It will be understood, of course, that these values are merely illustrative and that other values may be used.

The operation of the circuit of the present invention using the values shown in the drawing will now be described, and in so doing the function of the cathode resistor 23 and shunting diode 24 will be brought out more clearly.

(*a*) When triode 16 is not conducting, the steady-state circuit condition is as follows:

A current $i_a$ of 14 milliamperes flows through winding 17 and resistor 19. This value, which is sufficient to saturate an elemental area of the tape or other magnetic surface, is determined by the values of the voltage source B+ (210 volts) and the resistor 19 (15,000 ohms). The D.-C. resistance of winding 17 is negligible. Point A is at substantially ground potential and, ignoring the inverse diode current, no current flows through resistor 20 or choke 21 since the anode of diode 22 is biased back to —20 volts. A current $i_c$ of 30 milliamperes flows through cathode resistor 23 and diode 24. This value is determined by the difference between the voltage sources B— (—210 volts) and B— (—120 volts) and the value of cathode resistor 23 (3,000 ohms); the cathode 18 of the triode 16 is at the potential of source B— (—120 volts); the anode of triode 16 is at substantially ground potential.

(*b*) When the triode 16 is driven into conduction, the condition of the circuit during the transient state is as follows:

The anode of the triode (point P) is driven down well below the potential of source E— (—20 volts). This is due to the cathode 18 of the triode being at B— (—120 volts). Choke 21 offers a very high impedance to the initial surge of plate current in comparison with the impedance offered by the series path comprising resistor 20 and winding 17, and, as a consequence, the initial surge of current is almost entirely through the latter path. The controlling *L/R* time constant is that of the circuit comprising resistor 20 and the plate resistance of triode 16; the choke 21 prevents the low forward resistance of diode 22 from shorting the triode. In a typical case, the plate resistance of the triode may be 2000 ohms, and the *L/R* time constant 2.6 microseconds. Thus, the current reversal or switching of the magnetic recording head is effected in less than 3 microseconds. This compares to a writing (or reading) speed of the order of from 50 to 80 microseconds per elemental area. The combination of the cathode resistor 23 and the diode 24, together with the negative voltage sources shown, introduce a degenerative effect as soon as the plate current rises above 30 milliamperes, since at this value the diode 24 cuts off, and the tube sees an unbypassed cathode load resistor. Thus, the current through the winding 17 is in part regulated by cathode degeneration.

(*c*) When, with triode 16 conducting, the steady-state condition is reached, the circuit condition is as follows:

Point P is prevented by diode 22 from becoming more negative than E— (—20 volts) and point A is at substantially ground potential. Thus, a steady-state current of about 28 milliamperes flows through resistor 20, as determined by the chosen value of the resistor 20 (700 ohms) and the potential difference between E— (—20 volts) and ground. The steady-state current through resistor 19 is determined by the difference between B+ (+210 volts) and the potential at point A. Since point A is at substantially ground poetntial whether triode 16 be conducting or not, the current through resistor 19 remains the same for both states of triode 16. With the values shown in the drawing, 14 milliamperes of current flows in the same direction through resistor 19 when triode 16 is conducting as well as when triode 16 is cut off. With 28 milliamperes of current flowing through resistor 20, as indicated above, of which 14 milliamperes is through resistor 19 (indicated in the drawing by the dotted line $i_d$), the remaining 14 milliamperes is through the winding 17 (indicated in the drawing by the dotted line $i_b$). Thus, the steady-state value of current through the winding 17 is the same as that which flowed, in the opposite direction, prior to triode 16 being driven into conduction.

(*d*) When, as a result of a change in the D.-C. level of the voltage applied to the grid, the triode 16 cuts off, the circuit condition is as follows:

The current through winding 17 drops sharply, rapidly building up in the opposite direction to the steady-state value of 14 milliamperes determined by the values of potential source B+ and resistor 19. The *L/R* time constant which controls the transition or switch is that of the circuit comprising the winding 17 and the resistor 19. With the values shown, this time constant is about one-half microsecond.

It will be seen then that we have provided a write circuit, particularly useful in a change-of-polarity type of non-return-to-zero magnetic recording system, which is capable of regulating closely the current through the recording-head winding in both directions, yet capable of enabling very rapid switching action.

What is claimed is:

1. In a magnetic recording system; a magnetic recording-head winding and a first resistance, the resistance of said winding to D.-C. current being negligible compared with that of said first resistance; a source of positive D.-C. potential connected across said first resistance and winding in series to drive a current through said winding; and means responsive to a signal for switching substantially instantly the direction of said current through said winding while maintaining substantially constant the magnitude of the steady-state current, said switching and regulating means comprising: a uni-directional conducting device having at least triode elements; a second resistance connecting the anode of said device to the common junction of said winding and said first resistance; a third resistance connecting the cathode of said device to a source of negative D.-C. potential; a uni-directional conducting diode and a choke serially connecting the anode of said device to a source of intermediate D.-C. potential, said diode being so poled that its anode is connected to said source of intermediate D.-C. potential and its cathode is connected to said choke, the inductance of said choke being large relative to that of said winding, said intermediate D.-C. potential being negative relative to the potential at said common junction point but positive relative to the potential at said source of negative potential; and means connected to the grid-cathode circuit of said device and responsive to applied signals for changing the state of said device from non-conductive to conductive and from conductive to non-conductive.

2. In a magnetic recording system; a magnetic recording-head having a winding; a triode; means for applying alternately one of two different D.-C. potentials to the grid of said triode in response to one of which said triode becomes conductive and in response to the other of which said triode becomes non-conductive; first and second resistances connecting the anode of said triode to a source of positive D.-C. potential; means connecting said recording head winding between the common junction of said resistances and a point of reference potential; a cathode resistor connecting the cathode of said triode to a first source of negative D.-C. potential; a source of intermediate D.-C. potential substantially less positive than said source of positive potential but substantially more positive than said first source of negative potential; means including a uni-directional conducting diode and a choke serially connecting said source of intermediate potential to the anode of said triode, the anode of said uni-directional conducting diode being connected to said source of intermediate potential, the inductance of said choke being large relative to that of said magnetic recording-head winding.

3. Apparatus as claimed in claim 2 characterized in that connected across said cathode resistance is a uni-directional conducting diode the cathode of which is connected to the cathode of said triode and the anode of which is connected to a second source of negative potential substantially less negative than said first source but substantially more negative than said source of intermediate D.-C. potential.

4. Apparatus as claimed in claim 3 characterized in that the values of said sources of potential and of said first and second resistances are so chosen that the magnitude of the current through said second resistance when said triode is conductive is substantially twice that through said first resistance, whereby when said triode is conductive substantially equal amounts of current flow through said recording-head winding and through said first resistance, and whereby the steady-state current through said winding when said triode is conductive is substantially equal to that flowing in the opposite direction through said winding when said triode is cut off.

5. In a magnetic recording system; a magnetic recording-head having a winding; a uni-directional conducting device having anode, cathode and control electrodes and having conductive and non-conductive states of operation; a source of pulse signals for delivering pulses indicative of one of the binary digits, the absence of a pulse indicating the other binary digit; a flip-flop circuit; means for connecting said pulse source to said flip-flop circuit to change its state in response to each application of a pulse; means for connecting the output of said flip-flop circuit to the grid-cathode circuit of said device to change the state of said device in response to each change in the state of said flip-flop circuit; means including a source of positive D.-C. potential and a first resistance for passing a current through said magnetic recording-head winding in one direction when said device is in non-conductive state, the value of said resistance being large relative to the D.-C. resistance of said winding; a second resistance connecting the common junction of said first resistance and said winding to the anode of said device for passing a portion of the cathode-anode current of said device through said magnetic recording-head winding in the other direction when said device is conductive; and means including a uni-directional conducting diode and a choke whose inductance is large relative to that of said winding for connecting the anode of said device to a source of negative D.-C. potential to clamp the anode of said device at a fixed potential, thereby to control the amount of current passing through said second resistance and thereby to control the amount of current passing through said magnetic recording-head winding when said device is conducting.

6. Apparatus as claimed in claim 5 characterized in that the value of said source of negative D.-C. potential is so chosen that the current through said second resistance is twice that through said winding.

7. In a magnetic recording system; a recording head having a winding; means comprising a first voltage source and a first current-limiting resistance connected to said winding for passing a direct current therethrough of a value sufficient to but not substantially larger than that necessary to saturate an elemental area of a record surface, the value of said current-limiting resistance being large relative to the D.-C. resistance of said winding; and means for reversing the direction of said direct current through said winding and for regulating said reverse current at substantially said saturation value, said reversing and regulation means comprising: a uni-directional conducting device having anode, cathode and control electrodes, a second current-limiting resistance connecting the anode of said device to said first voltage source through said first current-limiting resistance, means for D.-C. clamping said anode to a fixed potential intermediate that of said first voltage source and the cathode potential of said device, to establish a fixed voltage drop across said second current-limiting resistance, thereby to regulate the reverse current through said second resistance at substantially twice the magnitude of said saturation value whereby approximately one-half of said reverse current flows through said first resistance, the remaining one-half flowing through said recording-head winding, said clamping means including means offering high impedance to transient current during the reversing period.

8. In a magnetic recording system; a magnetic surface; a recording head having a winding; means including a voltage source for passing a direct current through said winding of a value sufficient to saturate an elemental area of a record surface; and means responsive to an input signal for reversing the direction of current through said winding and for regulating the steady-state reverse current at substantially said saturation value, said reversing and regulating means including a uni-directional conductive device having anode, cathode and control electrodes, resistance means connecting said anode to said voltage source and to said winding, and means for D.-C. clamping the anode of said device to a fixed potential to regulate the current through said resistance means at approximately twice said saturation value, said clamping means including an impedance offering high impedance to transient current during the reversing period.

No references cited.